(12) United States Patent
Chen et al.

(10) Patent No.: US 6,646,977 B2
(45) Date of Patent: Nov. 11, 2003

(54) RESONANCE REMOVING MECHANISM

(75) Inventors: Hsin-Tso Chen, Taipei (TW); Chang-Ying Wu, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 226 days.

(21) Appl. No.: 09/900,864

(22) Filed: Jul. 10, 2001

(65) Prior Publication Data

US 2003/0012120 A1 Jan. 16, 2003

(51) Int. Cl.[7] ............................................. G11B 33/08
(52) U.S. Cl. ...................................................... 369/247
(58) Field of Search ................................ 369/247, 248, 369/263, 75.1; 360/97.02

(56) References Cited

U.S. PATENT DOCUMENTS

| | | | | |
|---|---|---|---|---|
| 4,796,849 A | * | 1/1989 | Fouassier | 369/263 |
| 5,737,304 A | * | 4/1998 | Soga et al. | 369/247 |
| 5,768,249 A | * | 6/1998 | Ro et al. | 369/263 |
| 5,936,927 A | * | 8/1999 | Soga et al. | 369/75.1 |
| 6,034,941 A | * | 3/2000 | Ro | 369/263 |
| 6,249,504 B1 | * | 6/2001 | Iwanaga | 369/247 |
| 6,324,153 B2 | * | 11/2001 | Furukawa et al. | 369/263 |

FOREIGN PATENT DOCUMENTS

| | | | | |
|---|---|---|---|---|
| JP | 63-261593 | * | 10/1988 | G11B/33/08 |
| JP | 02-137181 | * | 5/1990 | G11B/33/08 |

* cited by examiner

*Primary Examiner*—David L. Ometz
*Assistant Examiner*—Christopher R Beacham
(74) *Attorney, Agent, or Firm*—Rosenberg, Klein & Lee

(57) ABSTRACT

A resonance removing mechanism for a CD-RW drive is provided. The mechanism includes a first holding-down plate on which a read/write head is installed through two sliding rods. The first holding-down plate connects to a chassis frame through a series of first elastic pads, and a second holding-down plate is connected in parallel to the first holding-down plate through a series of second elastic pads. Active components are installed on the first holding-down plate and the second holding-down plate.

1 Claim, 4 Drawing Sheets

RESONANCE REMOVING MECHANISM

FIELD OF THE INVENTION

This invention relates to of resonance removing mechanism, in particular to a resonance removing mechanism, which is installed on CD-RW, drive to remove the resonance. The easily vibrated components are designed to be installed on the first holding-down plate supported by elastic pads and the second holding-down plate parallel to the first holding-down plate in order to provide the weight balance and vibration absorption function to reduce the resonance of the CD-RW drive.

BACKGROUND OF THE INVENTION

CD-RW drives are important devices on PC with which users may store, write or read a large number of data on CD-RW. It is difficult for conventional drives with small capacities to compare to the CD-RW drive nowadays.

In addition to the read rate, the precision of reading data is another indication to examine the quality of CD-RW drive. The problem most commonly encountered in the production technology is the vibration of the CD-RW drive caused by its driving components while it is in use. The sources of the vibration include the driving motors of the tray, read/write head and CD itself, wherein the motor driving the CD to rotate is the most obvious source of the vibration. The higher the read/write rate is, the more serious the vibration becomes, which directly reduces the reading precision of the read/write head.

SUMMARY OF THE INVENTION

The main objective of this invention is to provide a resonance removing mechanism installed on CD-RW drive. The easily vibrated components are designed to be installed on the first holding-down plate supported by elastic pads and the second holding-down plate parallel to the first holding-down plate provides the weight balance and vibration absorption functions to reduce the resonance of the CD-RE drive effectively.

According to the Invention, the CD-RW drive contains a tray, a read/write head, a CD-RW driving plate and other components. All these components are installed on a chassis frame, wherein the tray is controlled by the motor at the front of the chassis frame through a set of gears and a linking component so that it can expand and contract on the chassis frame. The read/write head is installed in the frame-shaped space of the first holding-down plate together with the CD-RW driving plate through two sliding rods. The first holding-down plate connects to the chassis frame through a serial of the first elastic pads, while a serial of the second elastic pads is installed and connects to the second holding-down plate parallel to the first holding-down plate to form a resonance removing mechanism.

In the resonance removing mechanism, the easily vibrated active components are installed on the first holding-down plate supported by the elastic pads and the second holding-down plate parallel to the first holding-down plate provides weight balance and vibration absorption functions to prevent resonance effectively and make the rotation and driving more stable and the read and write of the drive signal more precise.

BRIEF DESCRIPTION OF THE DRAWINGS

FIG. 4A is an enlarged view of a first portion of the cross-sectional view of FIG. 4.

FIG. 4B is an enlarged view of a second portion of the cross-sectional view of FIG. 4.

DETAILED DESCRIPTION OF THE PREFERRED EMBODIMENT

Figure 1:
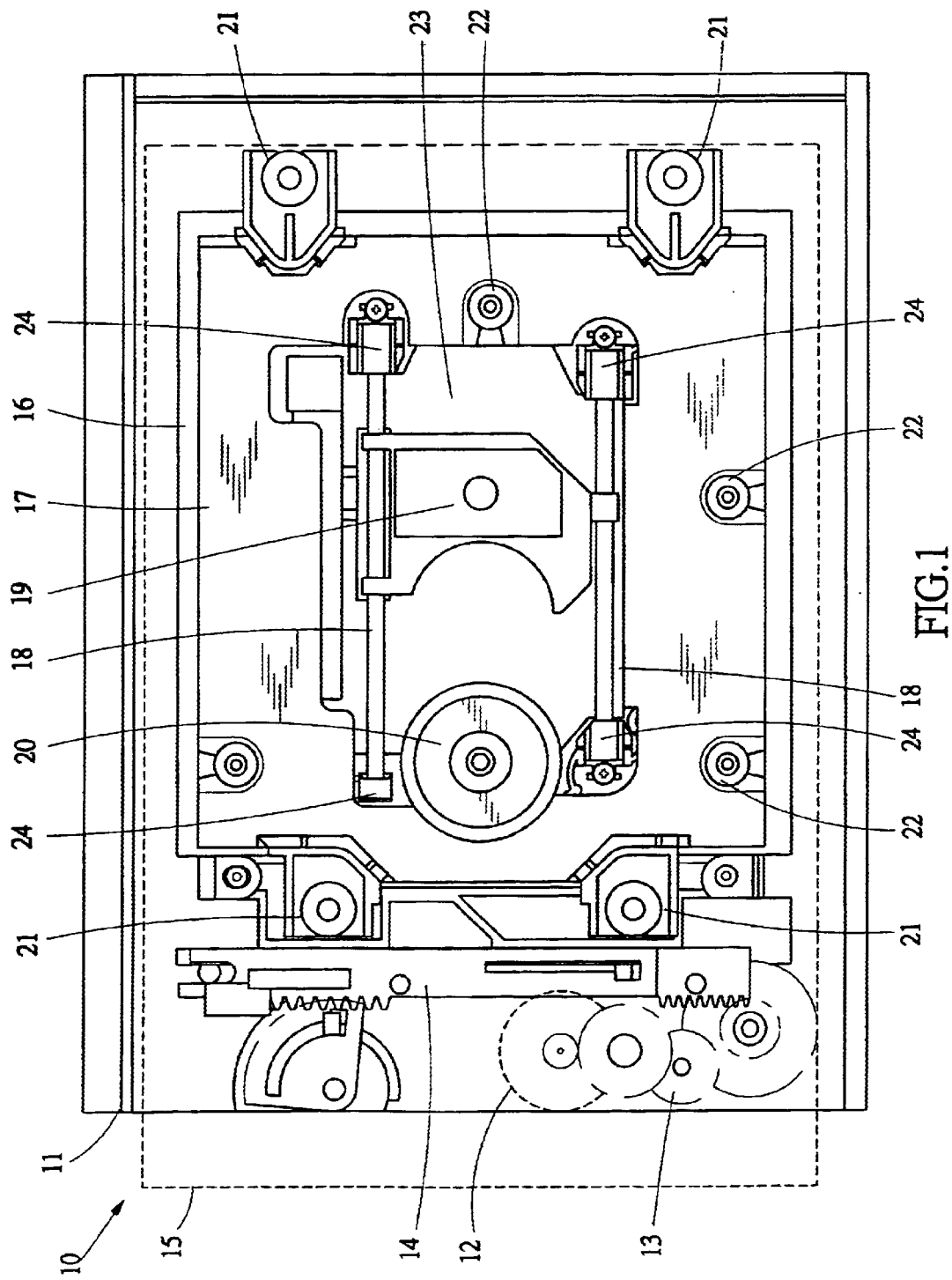
FIG. 1 is a plan view showing the resonance removing mechanism of the invention installed on a CD-RW drive.
Figure 2:
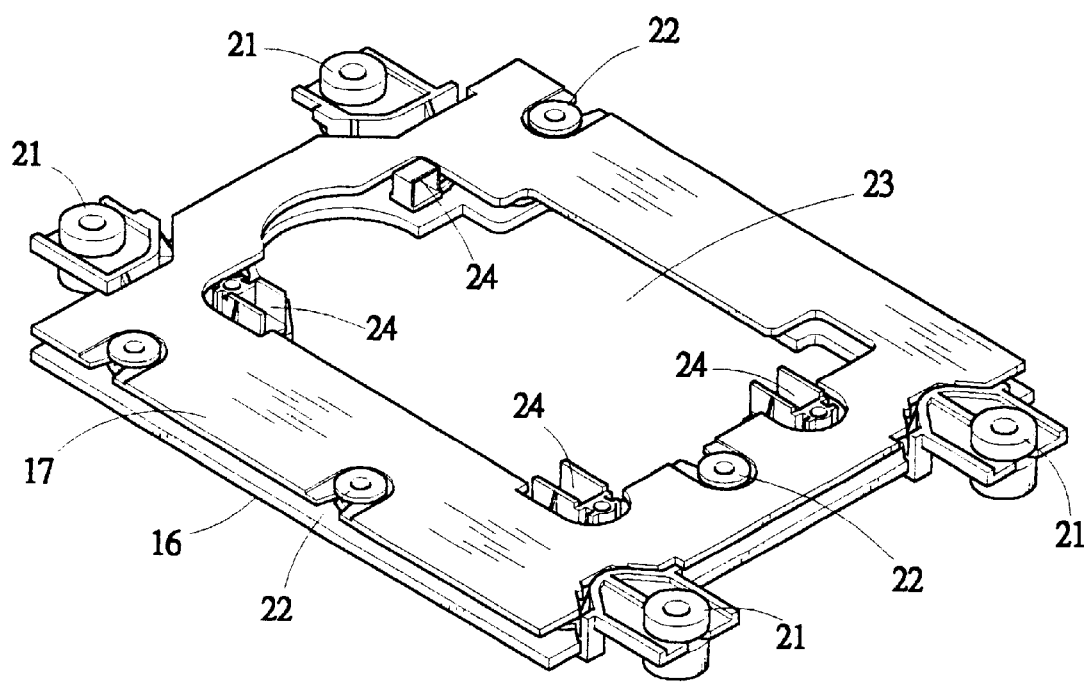
FIG. 2 is a perspective view, showing the first and second holding-down plates of the resonance removing mechanism.

Referring to FIGS. 1~2, the resonance removing mechanism of the said invention is installed on the CD-RW drive 10. The CD-RW drive 10 contains a tray 15, a read/write head 19, a CD-RW driving plate 20 and other components. All these components are installed on a chassis frame 11. The tray 15 is controlled by the motor 12 at the front of the chassis frame 11 through a set of gears 13 and a linking component 14, therefore, the tray 15 can expand and contract on the chassis frame 11 to carry the CD (not shown in the figures). The read/write head 19 and the CD-RW driving plate 20 connect to the chassis frame 11 through the resonance removing mechanism composed of the first holding-down plate 16 and the second holding-down plate 17 to remove the vibration between the CD-RW driving plate and the chassis frame 11.

As shown in FIGS. 1 and 2, the read/write head 19 is used to read/write data from/into CD. The read/write head 19 is installed between the two sliding rods 18 and controlled by the driving motor (not shown in the figures) and moved on the two sliding rods 18.

The CD-RW driving plate 20 is used to drive the CD to rotate so that the read/write head 19 can read/write data.

Figure 4:
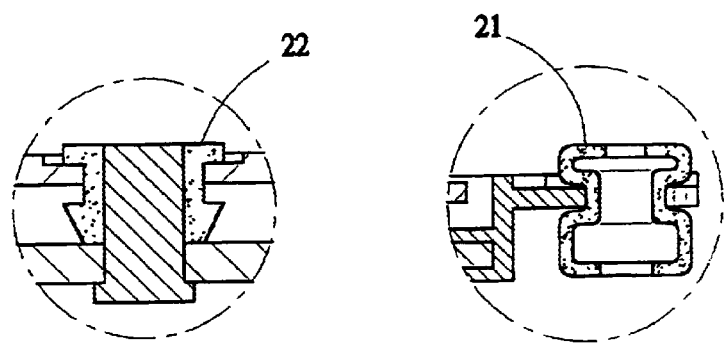
FIG. 4 is a cross-sectional view of the first and second holding-down plates shown in FIG. 2.
Figure 4:
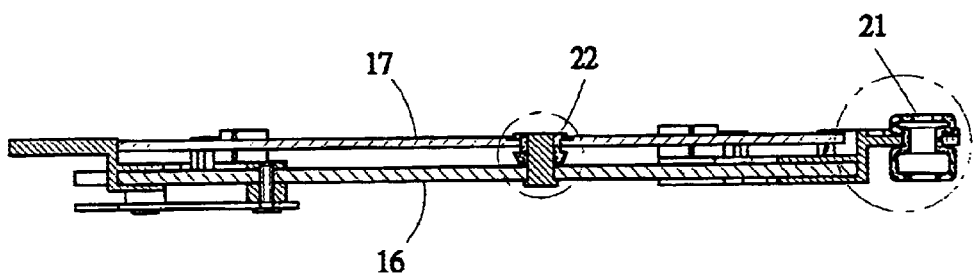

As shown in FIG. 1, the two ends of each of the two sliding rods 18 on which the read/write head 19 slides are fixed on the two sides of the frame-shaped space 23 of the first holding-down plate 16 through a sliding rod seat 24. The CD-RW driving plate 20 is also installed at one side of the frame-shaped space 23 of the first holding-down plate 16. The first holding-down plate 16 connects to the chassis frame 11 through a series of elastic pads 21 on the two end faces at the sides. As shown in FIGS. 4, 4A, and 4B, the plural first elastic pads 21 provide appropriate elasticity between the first holding-down plate 16 and the frame-shaped space 23 and isolates the vibration effectively.

Figure 3:
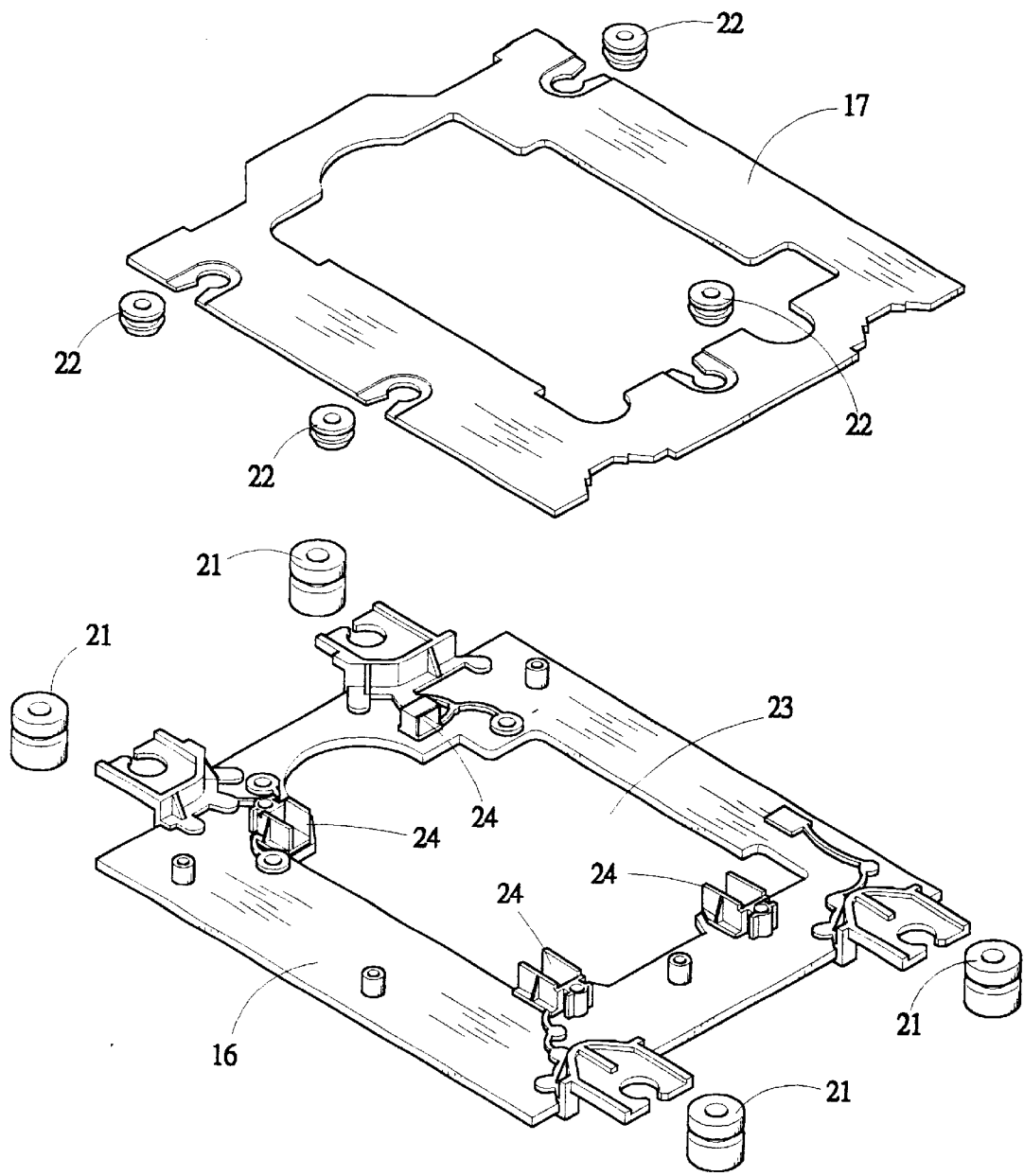
FIG. 3 is an exploded view of the first and second holding-down plates shown in FIG. 2.

As shown in FIGS. 2 and 3, the second holding-down plate 17 is similar to the first holding-down plate 16 in shape and connects to the first holding-down plate 16 through a series of second elastic pads 22. The first holding-down plate 16 and the second holding-down plate 17 are parallel to each other as shown in FIG. 4. The plural second elastic pads 22 provide appropriate elasticity between the first holding-down plate 16 and the second holding-down plate 17 to absorb the vibration on the first holding-down plate 16.

In the resonance removing mechanism, the easily vibrated active components, such as CD-RW driving plate 20, are installed on the first holding-down plate 16 supported by the plural number of elastic pads 21 to isolate the vibration effectively. While the second holding-down plate 17 is parallel to the first holding-down plate 16 in order to provide weight balance function for the first holding-down plate 16. As the second holding-down plate 17 connects to the first holding-down plate 16 through the plural number of the second elastic pads 22, it can absorb the vibration effectively and prevent the vibration of the first holding-down plate 16 from spreading outwards.

What is claimed is:

1. A resonance removing mechanism installed on a CD-RW drive to remove resonance, the CD-RW drive contains a tray, a read/write head, a CD-RW driving plate and other components, the tray controlled by a motor at the front of a chassis frame through a set of gears and a linking component; the read-write head installed between and sliding on two sliding rods and connecting to the chassis frame through the resonance removing mechanism composed of a first holding-down plate and a second holding-down plate to isolate the vibration between the CD-RW driving plate and the chassis frame, characterized in that:

each end of the sliding rods are fixed on the two sides of the frame-shaped space of the first holding-down plate through a sliding rod seat; the CD-RW driving plate is installed at one side of the frame-shaped space of the first holding-down plate; the first holding-down plate connects to the chassis frame through a series of elastic pads on the two end faces at the sides; a series of first elastic pads provide appropriate elasticity between the first holding-down plate and the frame-shaped space and isolate the vibration effectively; the second holding-down plate connects to the first holding-down plate through a series of second elastic pads.

* * * * *